United States Patent
Chung et al.

(10) Patent No.: US 10,867,198 B2
(45) Date of Patent: Dec. 15, 2020

(54) IMAGE CAPTURING DEVICE AND IMAGE CAPTURING MODULE

(71) Applicant: Gingy Technology Inc., Hsinchu (TW)

(72) Inventors: Wei-Chun Chung, Keelung (TW); Jen-Chieh Wu, Hsinchu (TW); Wen-Chen Lee, Hsinchu County (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 16/663,363

(22) Filed: Oct. 25, 2019

(65) Prior Publication Data

US 2020/0057899 A1 Feb. 20, 2020

Related U.S. Application Data

(63) Continuation-in-part of application No. 16/372,440, filed on Apr. 2, 2019, now Pat. No. 10,502,971.

(60) Provisional application No. 62/693,459, filed on Jul. 3, 2018, provisional application No. 62/784,755, filed on Dec. 25, 2018.

(30) Foreign Application Priority Data

Apr. 18, 2019  (CN) .................. 2019 2 0526854 U

(51) Int. Cl.
*G06K 9/00* (2006.01)
*G02B 27/30* (2006.01)
*G03B 11/00* (2006.01)

(52) U.S. Cl.
CPC ......... *G06K 9/00885* (2013.01); *G02B 27/30* (2013.01); *G03B 11/00* (2013.01)

(58) Field of Classification Search
CPC .... G02B 27/0018; G02B 27/30; G02B 5/003; G02B 6/08; H04N 5/2253; H04N 5/2254
See application file for complete search history.

(56) References Cited

U.S. PATENT DOCUMENTS

| 6,978,073 | B2 * | 12/2005 | Yamamoto | G02B 6/3644 |
| | | | | 385/137 |
| 7,835,079 | B2 * | 11/2010 | El-Ghoroury | G03B 21/625 |
| | | | | 359/456 |
| 9,090,315 | B1 * | 7/2015 | Stone | G02B 6/4458 |
| 9,392,129 | B2 * | 7/2016 | Simmons | G02B 26/0808 |
| 2003/0042424 | A1 * | 3/2003 | Eberhard | G01T 1/2002 |
| | | | | 250/370.11 |

(Continued)

*Primary Examiner* — Chiawei Chen
(74) *Attorney, Agent, or Firm* — JCIPRNET

(57) ABSTRACT

An image capturing device includes a cover plate, a sensing module, a frame body, a first adhesive layer, and a second adhesive layer is provided. The sensing module includes a sensor and a light collimator. The light collimator is disposed between the cover plate and the sensor. The light collimator includes a plurality of light collimating units. Each of the light collimating units includes at least one fiber and a plurality of light absorbing columns. The light absorbing columns are disposed parallel to the at least one fiber and surround the at least one fiber. A thickness of the light collimator is T. A distance between two light absorbing columns farthest from each other among the light absorbing columns in each of the light collimating units is D. A numerical aperture of the at least one fiber is NA, NA≤0.7, and $D \leq T \times \tan[\sin^{-1}(NA)]$.

23 Claims, 18 Drawing Sheets

(56) References Cited

U.S. PATENT DOCUMENTS

| | | | |
|---|---|---|---|
| 2014/0035959 A1* | 2/2014 | Lapstun | G02B 26/0833 345/690 |
| 2014/0186038 A1* | 7/2014 | Frisken | H04Q 11/0005 398/50 |
| 2016/0085143 A1* | 3/2016 | Hu | G02B 27/123 362/553 |
| 2018/0266641 A1* | 9/2018 | Albou | H01S 5/005 |
| 2018/0359384 A1* | 12/2018 | Nishida | H04N 1/04 |
| 2019/0021602 A1* | 1/2019 | Hurley | A61B 5/0071 |

* cited by examiner

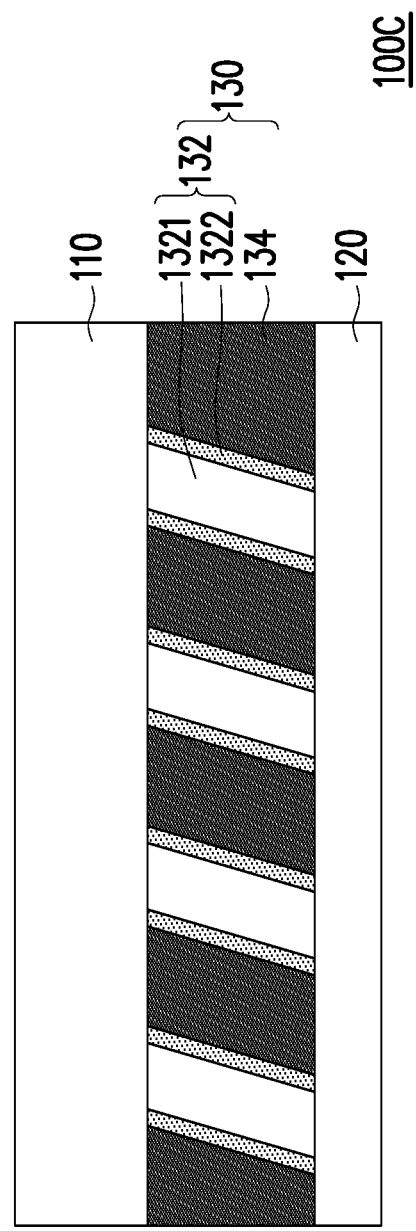
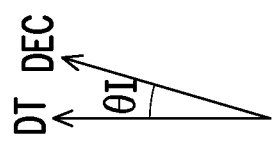
FIG. 8

IMAGE CAPTURING DEVICE AND IMAGE CAPTURING MODULE

CROSS-REFERENCE TO RELATED APPLICATION

This application is a continuation-in-part application of and claims the priority benefit of U.S. application Ser. No. 16/372,440, filed on Apr. 2, 2019, now allowed, which claims the priority benefit of U.S. provisional application Ser. No. 62/693,459, filed on Jul. 3, 2018. This application also claims the priority benefits of U.S. provisional application Ser. No. 62/784,755, filed on Dec. 25, 2018, and China application serial no. 201920526854.1, filed on Apr. 18, 2019. The entirety of each of the above-mentioned patent applications is hereby incorporated by reference herein and made a part of this specification.

BACKGROUND

Technical Field

The invention relates to an optoelectric device and an optoelectric module. More particularly, the invention relates to an image capturing device and an image capturing module.

Description of Related Art

Types of biometric identification include face, voice, iris, retina, vein, palm print, and fingerprint identifications. The biometric feature identification apparatuses may be categorized into the optical, capacitive, ultrasonic, and thermal induction identification apparatuses according to different sensing methods. Generally, an optical biometric feature identification apparatus includes a light source, a light guide device, and a sensor. The light beam emitted by the light source irradiates the object pressing on the light guide device. The sensor receives the light beam reflected by the object to identify biometric features. In the process of capturing an image by the sensor, the light beam reflected by the fingerprints may easily be transmitted to the sensor in a scattering manner, which may lead to poor image capturing quality and affect the identification result. Although several techniques are developed to improve the quality of image capturing, the crosstalk problem still can not be effectively improved by the exiting techniques.

SUMMARY

The invention provides an image capturing device and an image capturing module featuring a favorable identification capability and good visual effect.

An image capturing device in an exemplary embodiment of the invention includes a cover plate, a sensing module, a frame body, a first adhesive layer, and a second adhesive layer. The frame body and the sensing module are located on the same side of the cover plate. The frame body is joined to the cover plate through the first adhesive layer. The sensing module is joined to the frame body through the second adhesive layer, and an orthographic projection of the second adhesive layer on the cover plate falls within an orthographic projection of the frame body on the cover plate. The sensing module includes a sensor and a light collimator. The light collimator is disposed between the cover plate and the sensor. The light collimator includes a plurality of light collimating units. Each of the light collimating units includes at least one fiber and a plurality of light absorbing columns. The light absorbing columns are disposed parallel to the at least one fiber and surround the at least one fiber. A thickness of the light collimator is T. A distance between two light absorbing columns farthest from each other among the light absorbing columns in each of the light collimating units is D. A numerical aperture of the at least one fiber is NA, NA≤0.7, and D≤T×tan[sin$^{-1}$(NA)].

An image capturing module in an exemplary embodiment of the invention includes a cover plate, a sensor, a light collimator, a micro lens array, and an adhesive layer. The light collimator is disposed between the cover plate and the sensor. The light collimator includes a plurality of light collimating units, and each of the light collimating units includes at least one fiber and a plurality of light absorbing columns, wherein the light absorbing columns are disposed parallel to the at least one fiber and surrounding the at least one fiber. A thickness of the light collimator is T, a distance between two light absorbing columns farthest from each other among the light absorbing columns in each of the light collimating units is D, a numerical aperture of the at least one fiber is NA, NA 0.7, and D≤T×tan[sin$^{-1}$(NA)]. The micro lens array is disposed between the light collimator and the cover plate. The adhesive layer surrounds the micro lens array, wherein the cover plate is adhered to the light collimator through the adhesive layer, and an air gap is present between the cover plate and the micro lens array.

To sum up, in the image capturing device provided by the exemplary embodiments of the invention, since the light leaking from the clad is absorbed by the light absorbing columns surrounding the fiber, the crosstalk problem is effectively improved. Moreover, the frame body is adhered to the cover plate through the first adhesive layer, the sensing module is adhered to the frame body through the second adhesive layer, and the orthographic projection of the second adhesive layer on the cover plate falls within the orthographic projection of the frame body on the cover plate. Therefore, when viewed from the side of the cover plate, the second adhesive layer is covered by the frame body. By hiding the second adhesive layer under the frame body, it is possible to prevent the second adhesive layer from affecting the visual effect. In addition, since the sensing module is indirectly joined to the cover plate through the second adhesive layer, the frame body and the first adhesive layer, there is no need to provide an adhesive layer between the cover plate and the sensing module not covered by the frame body. With such design, there may be only one light transmission medium (such as air) between the cover plate and the sensing module not covered by the frame body, so the sensing module is not easily perceived by the user. Therefore, the image capturing device features a favorable identifying capability and good visual effect.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 to FIG. 11 are schematic cross-sectional views of image capturing modules according to other exemplary embodiments of the invention.

DESCRIPTION OF THE EMBODIMENTS

Figure 1A:
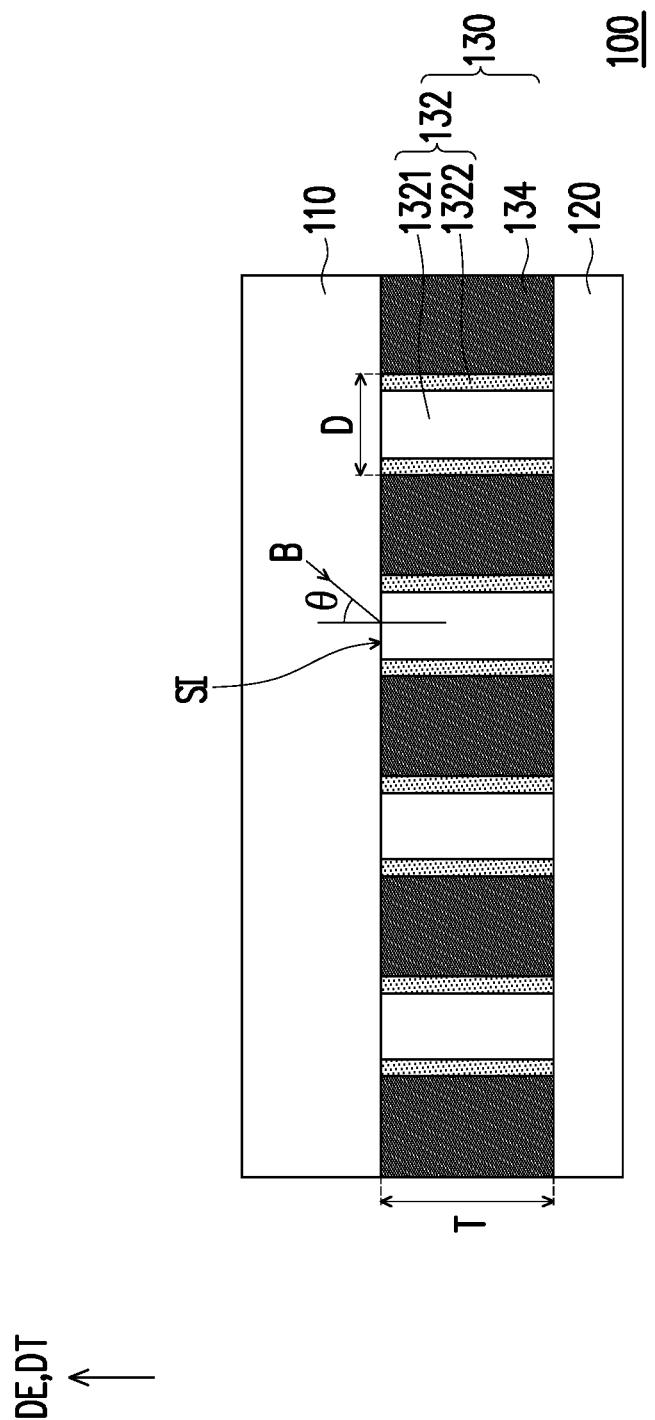
FIG. 1A is a schematic cross-sectional view of an image capturing module according to an exemplary embodiment of the invention.

It should be understood that the foregoing and other detailed descriptions, features, and effects are intended to be described more comprehensively by providing exemplary embodiments accompanied with drawings hereinafter.

In the drawings, common characteristics of the methods, structures and/or materials used in specific exemplary embodiments are shown. However, the drawings are not limited to the structures or features of the following exemplary embodiments and the drawings should not be interpreted to define or limit the scopes or the properties of the descriptions in the exemplary embodiments. For instance, the relative thickness and location of each film layer, region, and/or structure may be reduced or enlarged for clarity.

In the following exemplary embodiments, wording used to indicate directions, such as "up," "down," "front," "back," "left," and "right," merely refers to directions in the accompanying drawings. Therefore, the directional wording is used to illustrate rather than limit the invention. Moreover, the same or similar reference numerals represent the same or similar elements in any of the following exemplary embodiments, and repeated description thereof is thus omitted.

An image capturing module listed in the following exemplary embodiments is adapted to capture a biometric feature of an object. The object may be a finger, a palm, a wrist, or eyeballs. Correspondingly, the biometric feature may be fingerprints, palm prints, veins, pupils, or irises, but are not limited thereto.

Figure 1B:
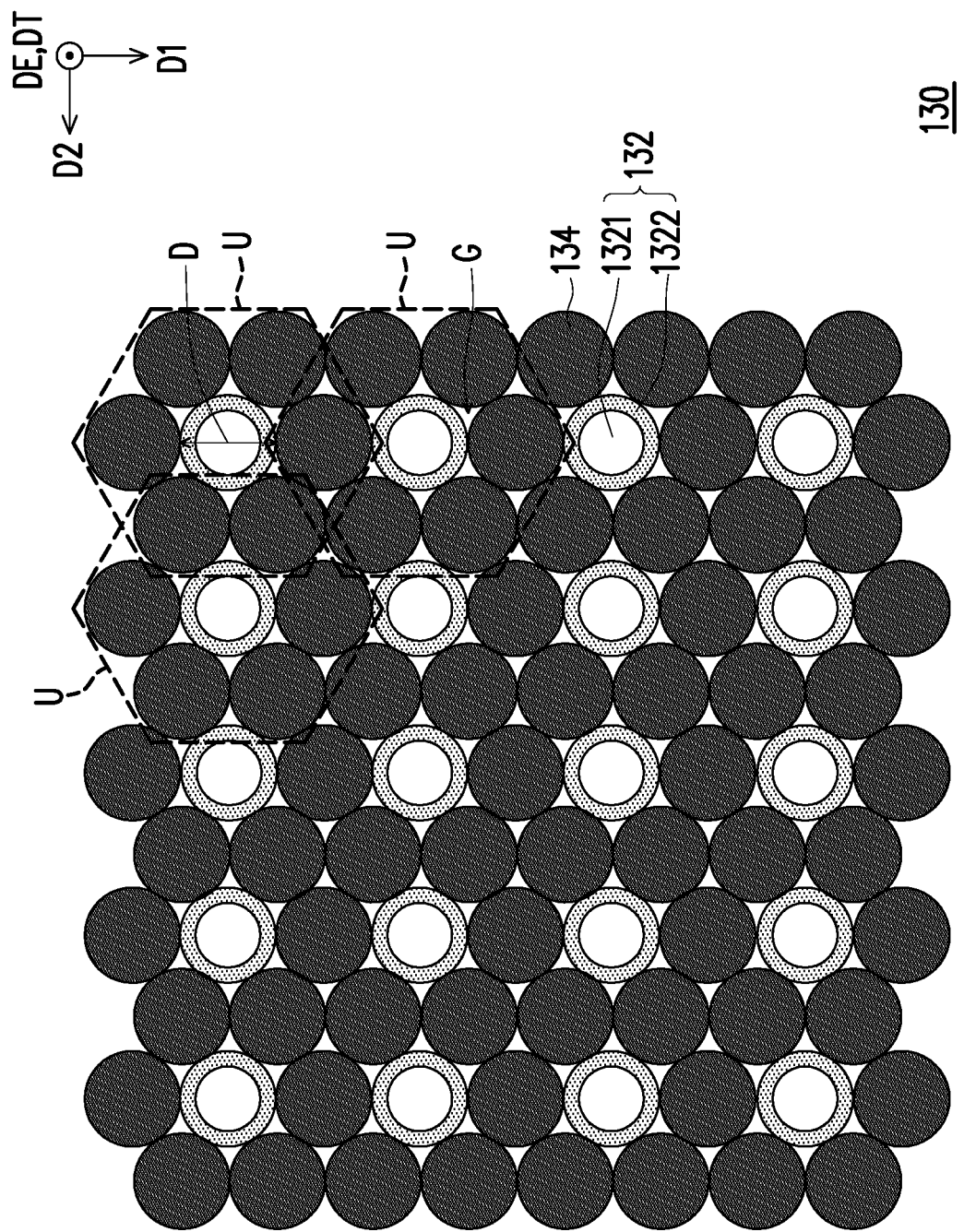
FIG. 1B is a schematic local top view of a light collimator in FIG. 1A.

FIG. 1A is a schematic cross-sectional view of an image capturing module according to an exemplary embodiment of the invention. FIG. 1B is a schematic local top view of a light collimator in FIG. 1A. With reference to FIG. 1A and FIG. 1B, an image capturing module 100 includes a cover plate 110, a sensor 120, and a light collimator 130.

The cover plate 110 is adapted to protect devices located below the cover plate 110 (e.g., the sensor 120 and the light collimator 130). For instance, the cover plate 110 may be a glass cover plate or a plastic cover plate, but is not limited thereto.

The sensor 120 is adapted to receive a light beam (i.e., a light beam carrying biometric feature information, not shown) reflected by the object (not shown). For instance, the sensor 120 may include a charge coupled device (CCD), a complementary metal-oxide semiconductor (CMOS), or optical sensing devices of other suitable types.

The light collimator 130 is disposed between the cover plate 110 and the sensor 120. Further, the light collimator 130 may be fixed together with an adjacent device (e.g., the cover plate 110 and the sensor 120) through an adhesive layer (not shown) or a fixing mechanism (not shown). The adhesive layer may be an optical clear adhesive (OCA), but is not limited thereto.

The light collimator 130 includes a plurality of light collimating units U (only three light collimating units U adjacent to one another are schematically shown in FIG. 1B). Each of the light collimating units U includes at least one fiber 132 and a plurality of light absorbing columns 134. The light absorbing columns 134 are disposed parallel to the at least one fiber 132 and surround the at least one fiber 132.

In this exemplary embodiment, each of the light collimating units U includes one fiber 132 and six light absorbing columns 134, as shown in FIG. 1B. The six light absorbing columns 134 are disposed around a circumference of the fiber 132, and adjacent two light collimating units U share at least one light absorbing column 134. The light collimating units U are arranged in a first direction D1 and in a second direction D2, respectively. The first direction D1 is perpendicular to the second direction D2. Further, the first direction D1 and the second direction D2 are perpendicular to a thickness direction DT of the cover plate 110. Two light collimating units U adjacent to each other in the first direction D1 share one light absorbing column 134, and two light collimating units U adjacent to each other in the second direction D2 share two light absorbing columns 134. In addition, in each of the light collimating units U, extending directions (e.g., a direction DE) of the fiber 132 and the six light absorbing columns 134 are perpendicular to the cover plate 110. In other words, the fiber 132 and the six light absorbing columns 134 extend in the thickness direction DT of the cover plate 110. Nevertheless, individual numbers of the fiber 132 and the light absorbing columns 134 in each of the light collimating units U, the number of light absorbing columns 134 shared by adjacent two light collimating units U, arrangement of the light collimating units U, and the extending directions of the fiber 132 and the light absorbing columns 134 may be changed according to needs and are not limited to the above.

Specifically, the fiber 132 is adapted to transmit the light beam reflected by the object to the sensor 120. The fiber 132 includes a core 1321 and a clad 1322 encapsulating the core 1321. A refractive index of the core 1321 is $n_1$, a refractive index of the clad 1322 is $n_2$, and $n_1 > n_2$ to satisfy the condition of total internal reflection (TIR). A numerical aperture of the fiber 132 is NA, and $NA = \sqrt{n_1^2 - n_2^2}$. A maximum incident angle of a light beam B incident into the light collimator 130 at a light incident surface SI of the fiber 132 (i.e., a maximum angle included between the light beam B and a normal direction of the light incident surface SI) is positively correlated with the numerical aperture of the fiber 132. That is, the smaller the numerical aperture of the fiber 132, the smaller the maximum incident angle of the fiber 132. An incident angle θ of the light beam B at the light incident surface SI is required to be less than the maximum incident angle, so that the light beam can be transmitted to the sensor 120 through total internal reflection after entering into the fiber 132. In other words, the smaller the numerical aperture of the fiber 132, the light beam transmitted to the sensor 120 can be collimated more effectively, so as to effectively improve the crosstalk problem. In this invention, $NA \leq 0.7$.

The light absorbing columns 134 are adapted to absorb stray light, such that, the stray light is prevented from being received by the sensor 120 to cause crosstalk. Specifically, if the incident angle θ of the light beam at the light incident surface SI is greater than the maximum incident angle, the light beam may be refracted on an interface between the core 1321 and the clad 1322 after entering the fiber 132, so that the light beam may easily leak out from the core 1321, and light leakage is thus generated. If no light absorbing column 134 is disposed, the leaking light may be transmitted to the sensor 120 through the adjacent fiber and thereby causes crosstalk. Nevertheless, when the fiber 132 is surrounded by the light absorbing columns 134, the light beam leaking from the core 1321 is absorbed by the light absorbing columns 134 and thus is not transmitted to the sensor 120. Therefore, the crosstalk problem may be effectively improved when the light absorbing columns 134 are disposed. As shown in FIG. 1B, each of the light absorbing columns 134 can be a solid light absorbing column body, but is not limited thereto.

In each of the light collimating units U in the light collimator 130, gaps G exist between the fiber 132 and the light absorbing columns 134. The gaps G may be filled with air. Alternatively, the gaps G may be filled with a light transmissive medium or a non-light transmissive medium (e.g., a light absorbing medium). For instance, the gaps G may be filled with a transparent or a colored (e.g., dark-colored) adhesive. If the gaps G are filled with a light transmissive medium (not shown), a refractive index of the light transmissive medium is preferably to be greater than a refractive index of the clad 1322. In this way, since total internal reflection does not occur at an interface between the light-transmitting medium and the shell 1322, the large-angle light leakage is not returned to the optical fiber 132 by total internal reflection. In contrast, after leaking out from the clad 1322 and entering the gaps G, the large-angle light leakage may then be absorbed by the light absorbing columns 134.

The capability of the light collimator 130 to improve crosstalk is related to a thickness T of the light collimator 130 and a distance D between two light absorbing columns 134 farthest from each other among the light absorbing columns 134 in each of the light collimating units U. Specifically, if the distance D is unchanged, the thicker the light collimator 130, light beams incident at larger angles are more likely to be filtered out; nevertheless, the overall module becomes thicker. From another perspective, if the thickness T of the light collimator 130 is unchanged, the smaller the distance D, the light beams incident at larger angles are more likely to be filtered out; nevertheless, the amount of light incident into the sensor 120 decreases. In the invention, since $D \leq T \times \tan[\sin^{-1}(NA)]$, the crosstalk problem is improved while the thickness of the module and the amount of light incident into the sensor 120 are also taken into account.

FIG. 2 to FIG. 5 are schematic local top views of other types of light collimators of the invention. According to different needs, the light collimator 130 of the image capturing module 100 in FIG. 1A may be replaced with light collimators 130A, 130B, 130C, and 130D shown in FIG. 2 to FIG. 5.

With reference to FIG. 1B to FIG. 5, differences among the light collimators 130, 130A, 130B, 130C, and 130D include constitutions of the light collimating units, arrangements of the light collimating units, the numbers of the light absorbing columns shared by adjacent two light collimating units, and the distance between two light absorbing columns farthest from each other among the light absorbing columns in each of the light collimating units.

Figure 2:
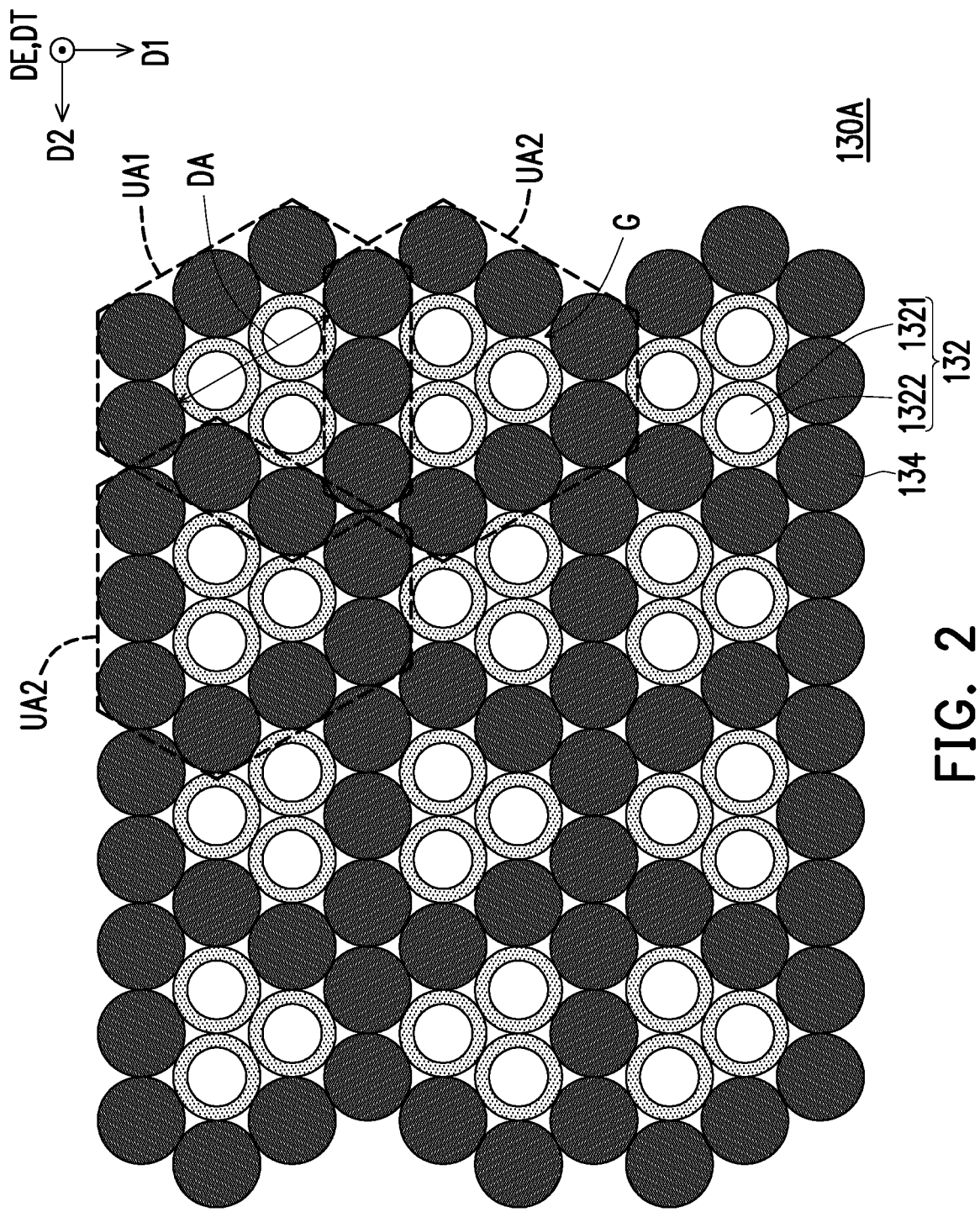
FIG. 2 to FIG. 5 are schematic local top views of other types of light collimators of the invention.

Specifically, in FIG. 2, the light collimator 130A includes a plurality of light collimating units UA1 and a plurality of light collimating units UA2. Each of the light collimating units (including the light collimating units UA1 and the light collimating units UA2) is constituted by three fibers 132 and nine light absorbing columns 134. The light collimating units UA1 and the light collimating units UA2 are arranged in an alternating arrangement manner in the first direction D1 and the second direction D2, respectively. Further, the light collimating units UA1 and the light collimating units UA2 are mirror symmetric relative to the second direction D2 as the symmetric axis. The light collimating unit UA1 and the light collimating unit UA2 adjacent to each other in the first direction D1 share three light absorbing columns 134, and the light collimating unit UA1 and the light collimating unit UA2 adjacent to each other in the second direction D2 share two light absorbing columns 134. In addition, in each of the light collimating units (including the light collimating units UA1 and the light collimating units UA2), a distance DA between two light absorbing columns 134 farthest from each other among the light absorbing columns 134 is two times greater than the distance D in FIG. 1B.

Figure 3:
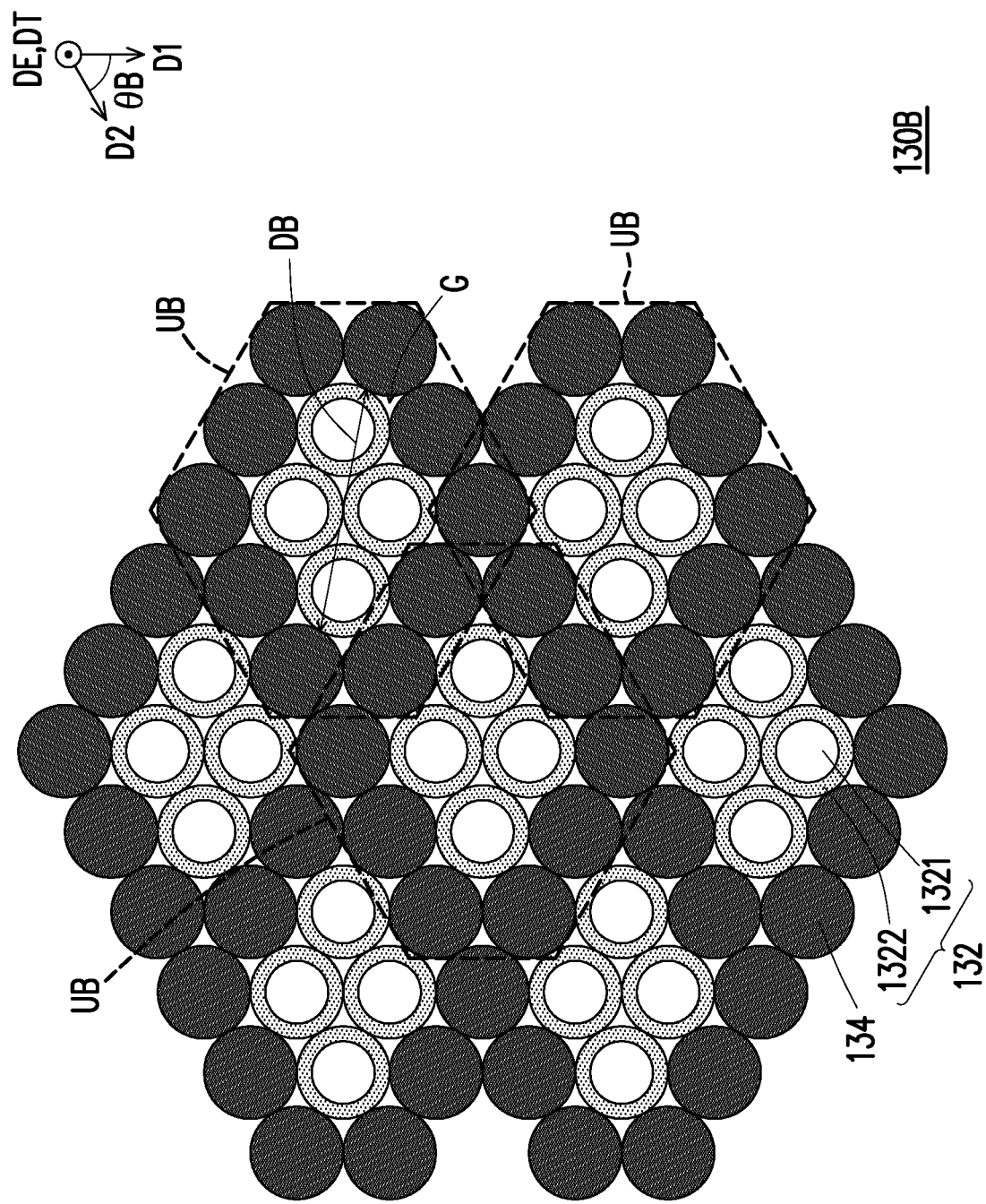

In FIG. 3, the light collimator 130B includes a plurality of light collimating units UB. Each of the light collimating units UB is constituted by four fibers 132 and ten light absorbing columns 134. The light collimating units UB are arranged in the first direction D1 and the second direction D2, respectively. Herein, an included angle θB between the first direction D1 and the second direction D2 is greater than 0 degrees and less than 90 degrees. Two light collimating units UB adjacent to each other in the first direction D1 share one light absorbing column 134, and two light collimating units UB adjacent to each other in the second direction D2 share two light absorbing columns 134. In addition, in each of the light collimating units UB, a distance DB between two light absorbing columns 134 farthest from each other among the light absorbing columns 134 is two times to three times greater than the distance D in FIG. 1B.

Figure 4:
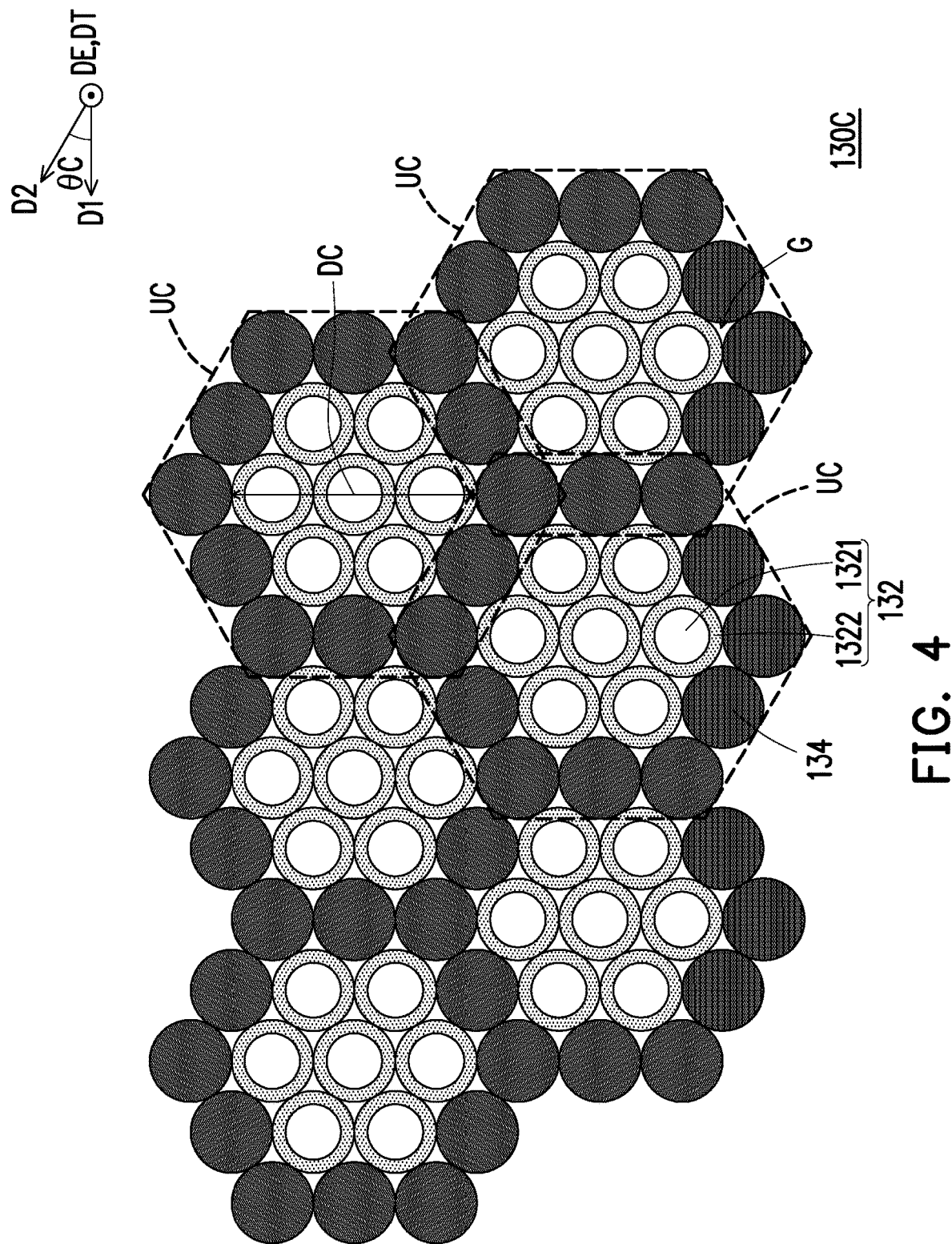

In FIG. 4, the light collimator 130C includes a plurality of light collimating units UC. Each of the light collimating units UC is constituted by seven fibers 132 and twelve light absorbing columns 134. The light collimating units UC are arranged in the first direction D1 and the second direction D2, respectively. Herein, an included angle θC between the first direction D1 and the second direction D2 is greater than 0 degrees and less than 90 degrees. Two light collimating units UC adjacent to each other in the first direction D1 share three light absorbing columns 134, and two light collimating units UC adjacent to each other in the second direction D2 share three light absorbing columns 134. In addition, in each of the light collimating units UC, a distance DC between two light absorbing columns 134 farthest from each other among the light absorbing columns 134 is three times greater than the distance D in FIG. 1B.

Figure 5:
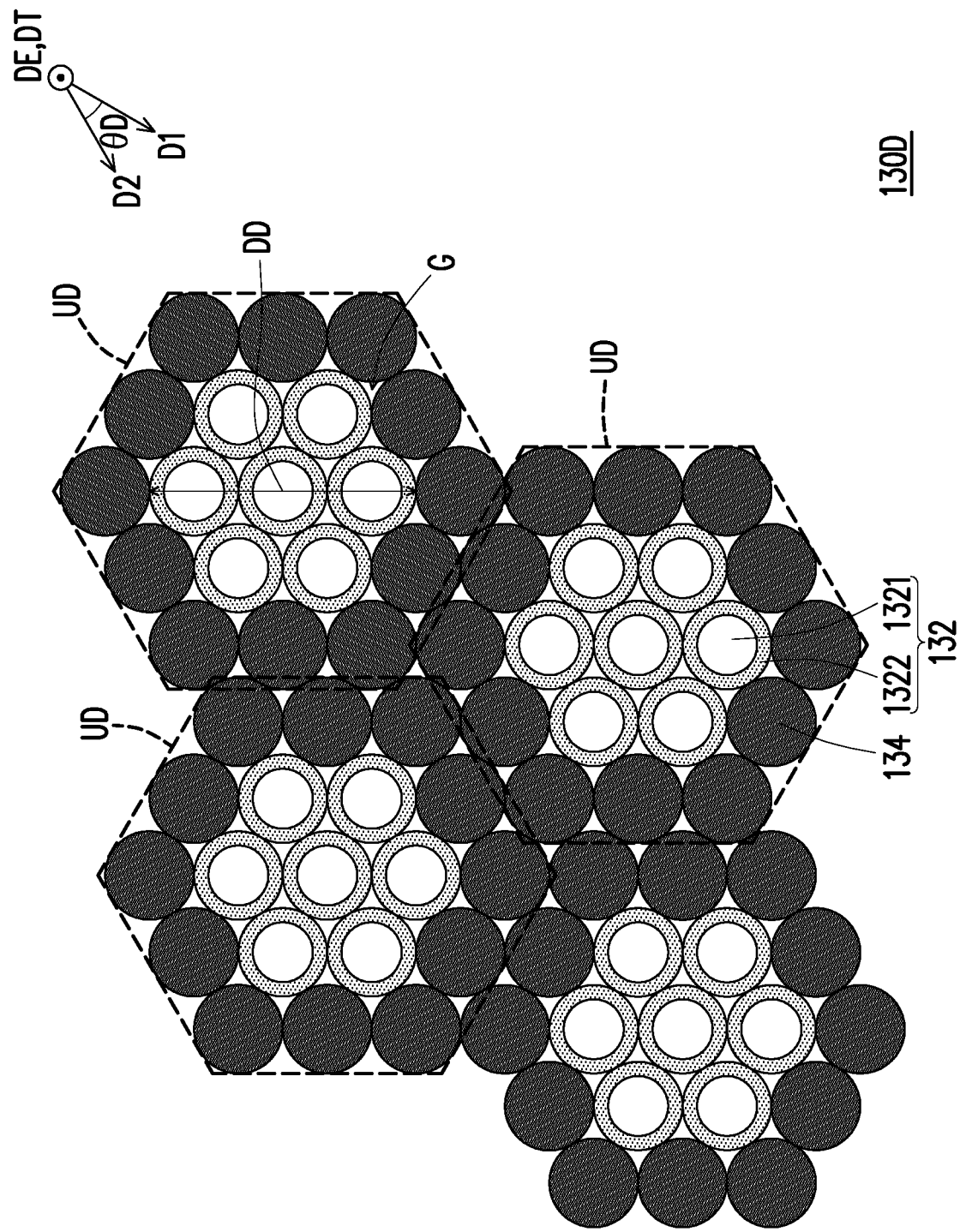

In FIG. 5, the light collimator 130D includes a plurality of light collimating units UD. Each of the light collimating units UD is constituted by seven fibers 132 and twelve light absorbing columns 134. The light collimating units UD are arranged in the first direction D1 and the second direction D2, respectively. Herein, an included angle θD between the first direction D1 and the second direction D2 is greater than 0 degrees and less than 90 degrees. Two light collimating units UD adjacent to each other in the first direction D1 do not share any light absorbing column 134, and two light collimating units UD adjacent to each other in the second direction D2 do not share any light absorbing column 134. In addition, in each of the light collimating units UD, a distance DD between two light absorbing columns 134 farthest from each other among the light absorbing columns 134 is three times greater than the distance D in FIG. 1B. Since any adjacent two light collimating units UD do not share any light collimating unit 134, the light collimator 130D in FIG. 5 is easier to manufacture compared to the light collimator 130C in FIG. 4.

Arrangement of the fibers and the light absorbing columns of FIG. 1B to FIG. 5 may be adopted by any exemplary embodiment below, which will not be described again hereinafter.

FIG. 6 to FIG. 11 are schematic cross-sectional views of image capturing modules according to other exemplary embodiments of the invention.

Figure 6:

With reference to FIG. 6, a difference between an image capturing module 100A and the image capturing module 100 of FIG. 1A is described as follows. In the image capturing module 100A, a clad 1322A of a fiber 132A further includes a plurality of light absorption particles P to absorb the stray light entering the clad 1322A.

Figure 7:
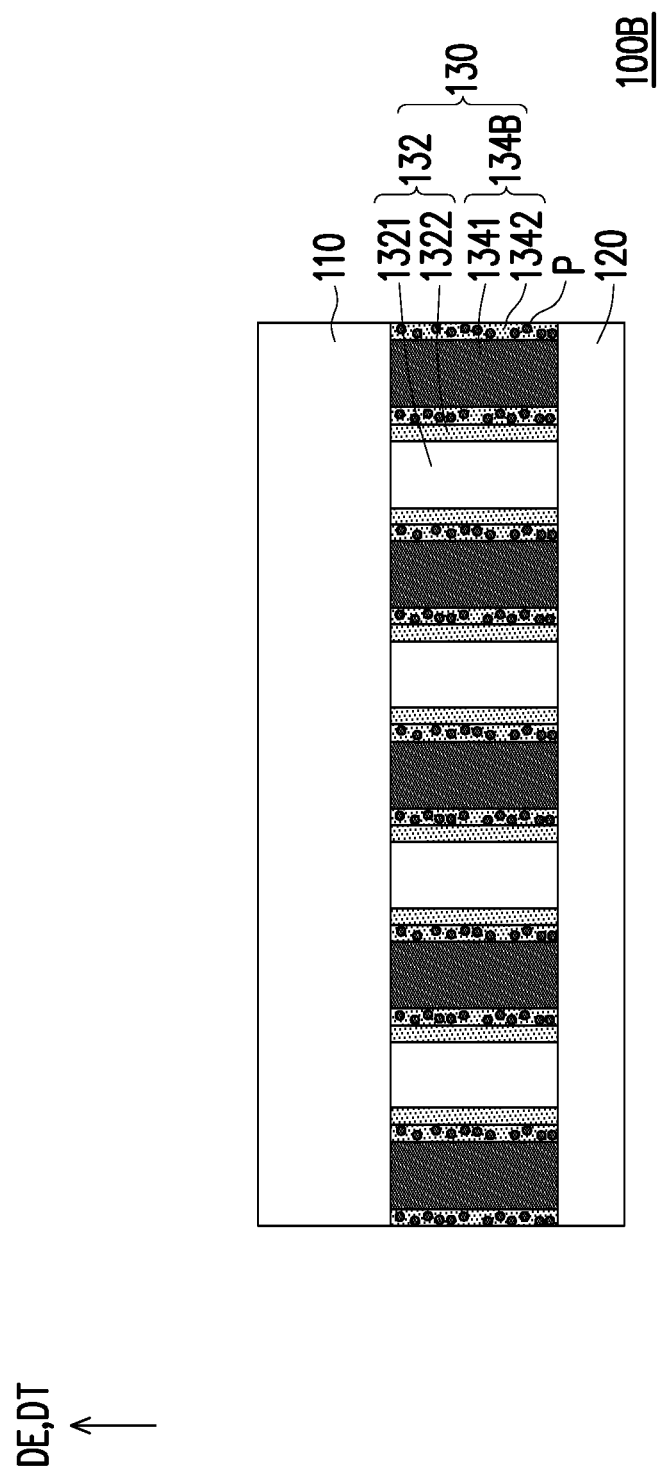

With reference to FIG. 7, a difference between an image capturing module 100B and the image capturing module 100 of FIG. 1A is described as follows. In the image capturing module 100B, each of light absorbing columns 134B includes a light absorbing core 1341 and a clad 1342. Further, the light absorbing core 1341 is a solid light absorbing column body. The clad 1342 surrounds the light absorbing core 1341, and the clad 1342 includes a plurality of light absorption particles P.

In an exemplary embodiment, the fiber 132 in the image capturing module 100B may be replaced with the fiber 132A of FIG. 6. That is, the clad 1322 in FIG. 7 may further include the light absorption particles P as well.

With reference to FIG. 8, a difference between an image capturing module 100C and the image capturing module 100 of FIG. 1A is described as follows. In the image capturing module 100C, extending directions (e.g., a direction DEC) of the fiber 132 and the light absorbing columns 134 are inclined with respect to the cover plate 110. In other words, an included angle θI between the extending direction (e.g., the direction DEC) and the thickness direction DT of the cover plate 110 is between 0 degrees and 90 degrees.

According to different needs, the fiber 132 in the image capturing module 100C may be replaced with the fiber 132A in FIG. 6, and/or the light absorbing columns 134 in the image capturing module 100C may be replaced with the light absorbing columns 134B in FIG. 7.

Figure 9:
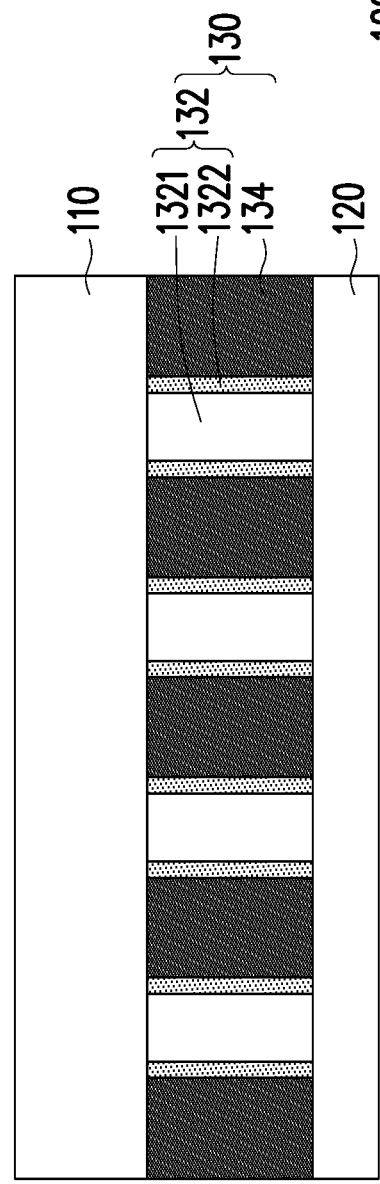

With reference to FIG. 9, a difference between an image capturing module 100D and the image capturing module 100 of FIG. 1A is that the image capturing module 100D further includes a light source 140. The light source 140 is disposed next to the sensor 120. A light beam emitted by the light source 140 may be used for the biometric feature identification. For instance, the light source 140 may include a non-visible light source such as an infrared light source, but is not limited thereto.

According to different needs, the fiber 132 and the light absorbing columns 134 in the image capturing module 100D may be inclined with respect to the cover plate 110 (see FIG. 8); the fiber 132 in the image capturing module 100D may be replaced with the fiber 132A in FIG. 6; and/or the light absorbing columns 134 in the image capturing module 100D may be replaced with the light absorbing columns 134B in FIG. 7.

Figure 10:
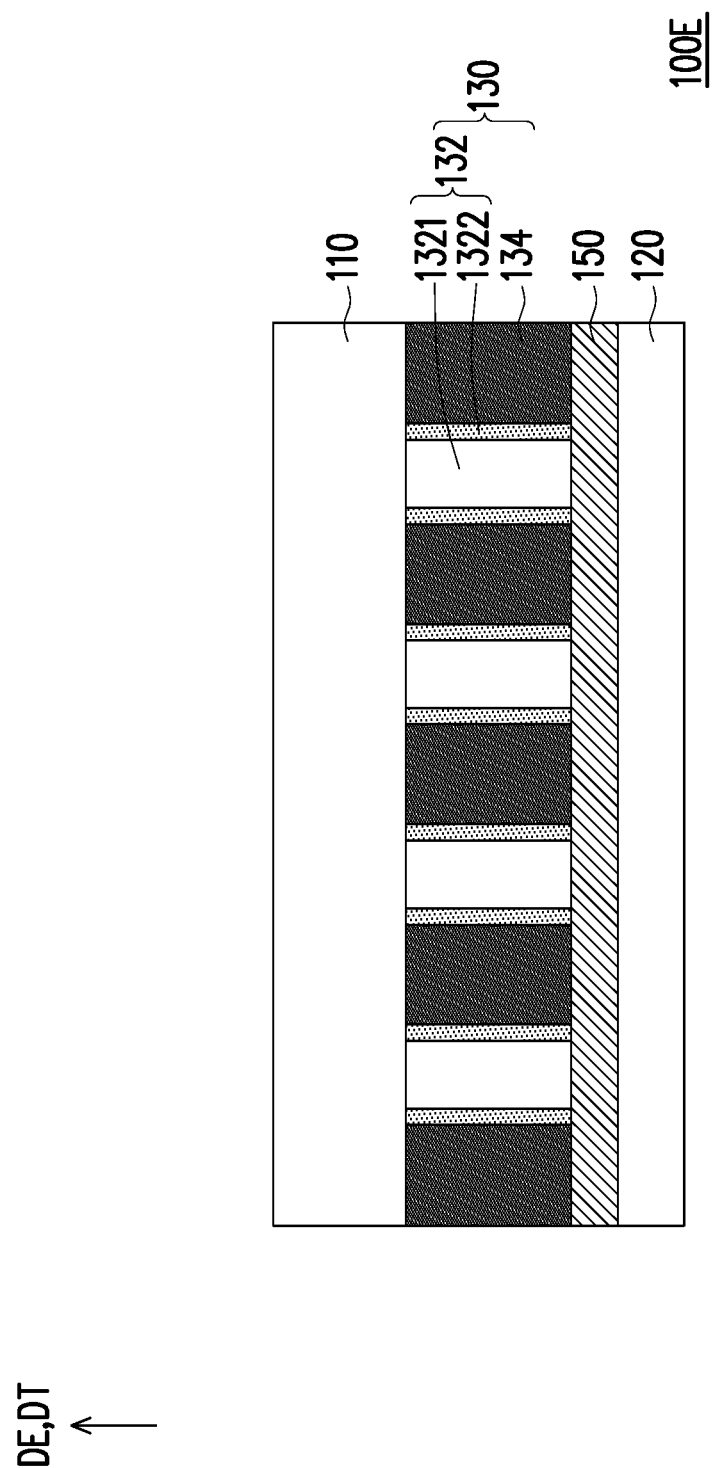

With reference to FIG. 10, a difference between an image capturing module 100E and the image capturing module 100 of FIG. 1A is that the image capturing module 100E further includes a band pass filter 150. The band pass filter 150 is disposed between the light collimator 130 and the sensor 120. The band pass filter 150 is adapted to filter out a light beam (a wave band which is not used for the biometric feature identification) in ambient light beams that is not intended to be received by the sensor 120.

According to different needs, the image capturing module 100E may further include the light source 140 shown in FIG. 9 while at least a portion of an emission spectrum of the light source 140 overlaps a transmission spectrum of the band pass filter 150; the fiber 132 and the light absorbing columns 134 in the image capturing module 100E may be inclined with respect to the cover plate 110 (see FIG. 8); the fiber 132 in the image capturing module 100E may be replaced with the fiber 132A in FIG. 6; and/or the light absorbing columns 134 in the image capturing module 100E may be replaced with the light absorbing columns 134B in FIG. 7.

Figure 11:
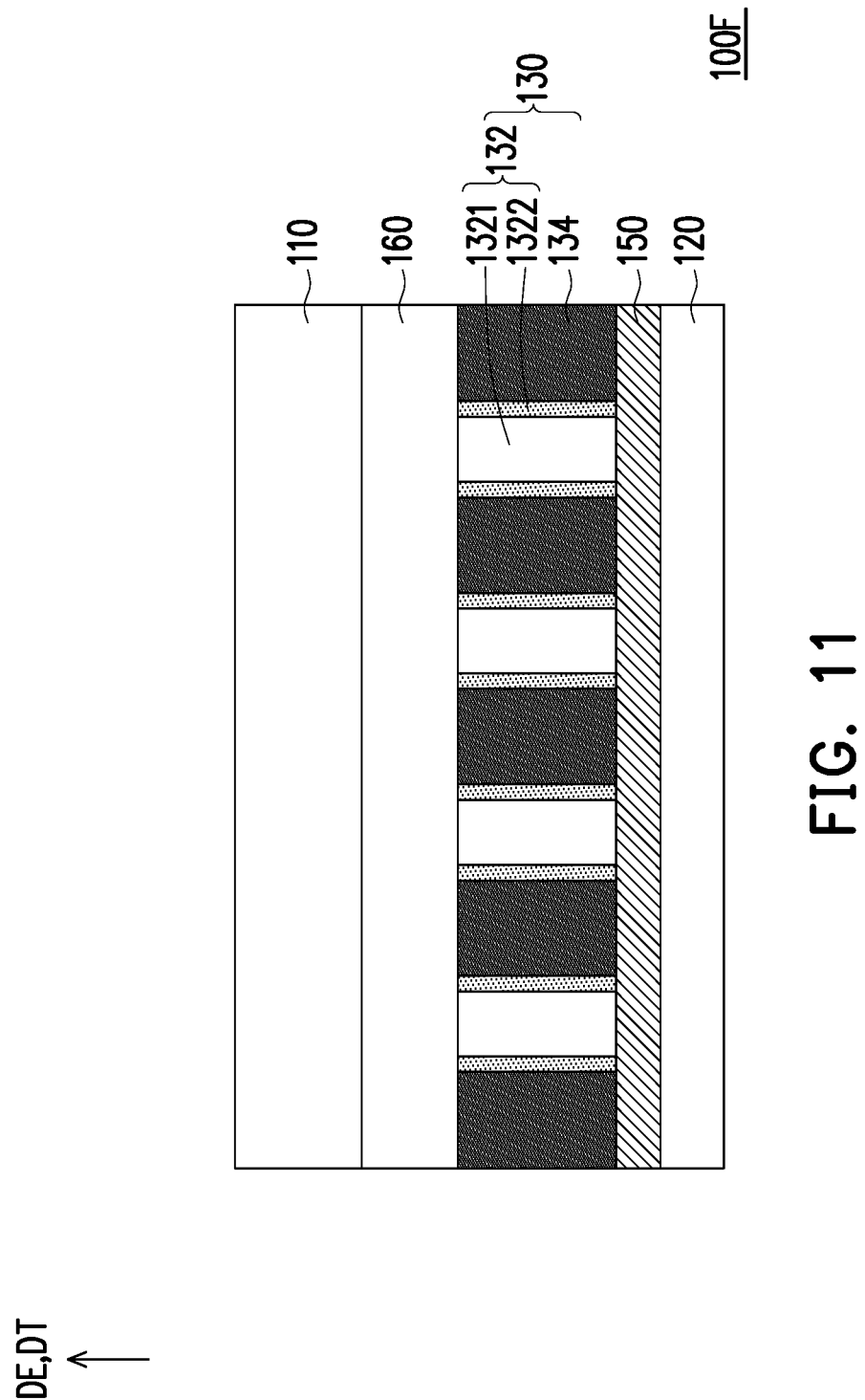

With reference to FIG. 11, a difference between an image capturing module 100F and the image capturing module 100E of FIG. 10 is that the image capturing module 100F further includes a display panel 160. The display panel 160 is disposed between the cover plate 110 and the light collimator 130. The display panel 160 is adapted to provide a display image. In this exemplary embodiment, a portion of a light beam provided by the display panel 160 may be used for the biometric feature identification. Under such a structure, at least a portion of an emission spectrum of the display panel 160 overlaps the transmission spectrum of the band pass filter 150.

According to different needs, the image capturing module 100F may further include the light source 140 shown in FIG. 9, wherein the display panel 160 may simply be configured to provide the display image, the light source 140 provides the light beam for the biometric feature identification, and at least a portion of an emission spectrum of the light source 140 overlaps the transmission spectrum of the band pass filter 150; the fiber 132 and the light absorbing columns 134 in the image capturing module 100F may be inclined with respect to the cover plate 110 (see FIG. 8); the fiber 132 in the image capturing module 100F may be replaced with the fiber 132A in FIG. 6; and/or the light absorbing columns 134 in the image capturing module 100F may be replaced with the light absorbing columns 134B in FIG. 7.

FIG. 12 to FIG. 16 are schematic cross-sectional views of image capturing devices 1 to 5 according to the first to the fifth exemplary embodiments of the disclosure, respectively. Each of the image capturing devices 1 to 5 is adapted to capture biometric features of an object (not shown). For example, the object may be a finger, and the biometric feature may be a fingerprint or a vein, i.e., each of the image capturing devices 1 to 5 may be a fingerprint image capturing device or a vein image capturing device, but not limited thereto. In an exemplary embodiment, the object may be a palm, and the biometric feature may be a palm print i.e., each of the image capturing devices 1 to 5 may be a palm print image capturing device.

Figure 12:
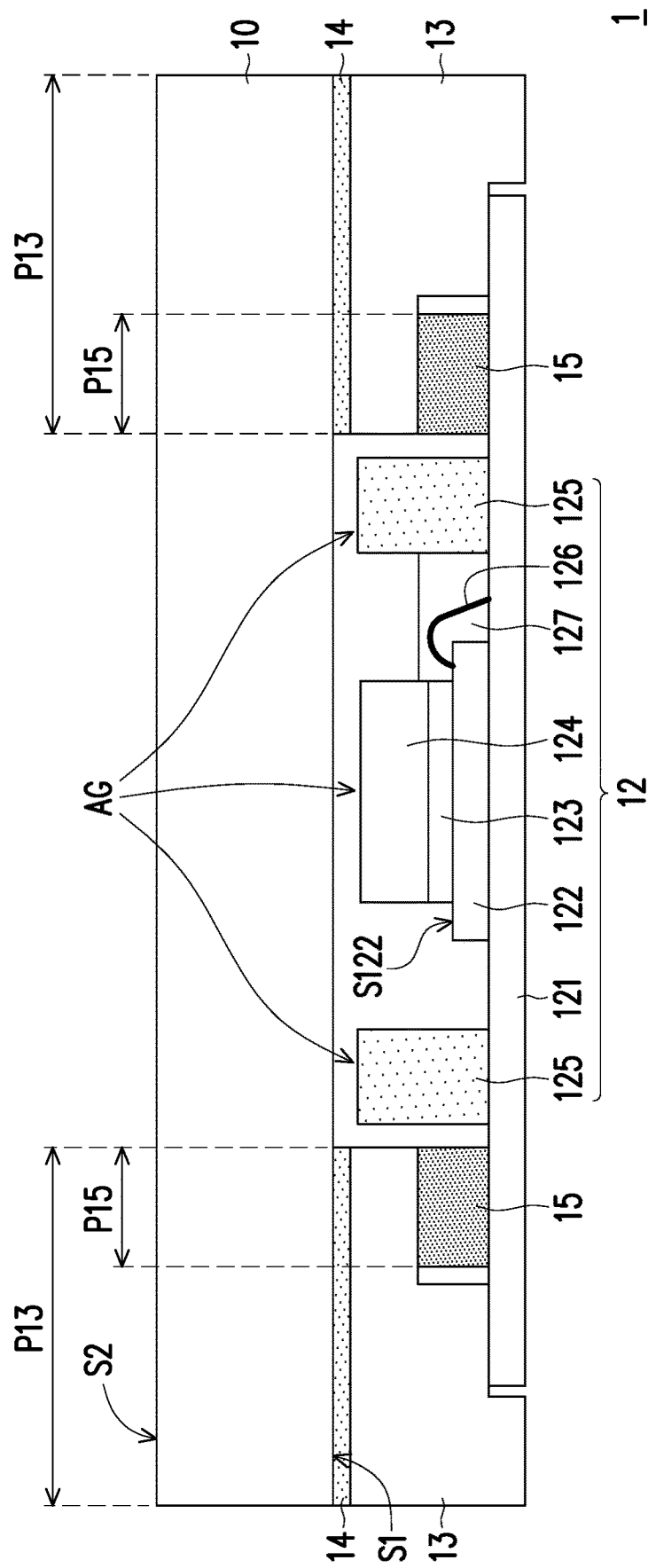
FIG. 12 to FIG. 16 are schematic cross-sectional views of image capturing devices according to the first to the fifth exemplary embodiments of the disclosure, respectively.

With reference to FIG. 12, the image capturing device 1 in the first exemplary embodiment of the invention includes a cover plate 10, a sensing module 12, a frame body 13, a first adhesive layer 14, and a second adhesive layer 15.

The cover plate 10 may include a transparent cover plate, a display panel, a touch panel, or a combination of at least two of the above. When the cover plate 10 is a display panel, the image capturing device 1 can further have a display function. Moreover, a portion of the light beam emitted from the display panel may be used for image capturing. The display panel may be an organic light emitting display panel, but not limited thereto. Moreover, the display panel may be a rigid display panel or a flexible display panel. When the cover plate 10 is a transparent cover plate, the cover plate 10 can be configured to protect the components located underneath. For example, the transparent cover plate can be a glass cover plate or a plastic cover plate. The glass cover plate may be a chemically strengthened or physically strengthened glass substrate or a non-strengthened glass substrate. The plastic cover plate may be a substrate made of polycarbonate (PC), polyethylene terephthalate (PET), polymethylmethacrylate (PMMA) or polyimide (PI), but not limited thereto.

The cover plate 10 has an inner surface S1 and an outer surface S2. The inner surface S1 is a surface of the cover plate 10 facing the sensing module 12. The outer surface S2 is opposite to the inner surface S1, and the outer surface S2 is a surface of the cover plate 10 facing the object. When performing biometric identification, the object is pressed on the outer surface S2. In other words, the outer surface S2 is the pressing surface of the object. The cover plate 10 may be located at the top or bottom of an electronic device. When the cover plate 10 is located at the top of an electronic device, the outer surface S2 faces the user and the cover plate 10 is located between the sensing module 12 and the user when performing biometric identification. When the cover plate 10 is located at the bottom (back) of an electronic device (e.g. the cover plate 10 serves as a back plate of the electronic device), the outer surface S2 faces away from the user and the sensing module 12 is located between the cover plate 10 and the user when performing biometric identification. Namely, the object (e.g. a finger of the user) touches the back of the electronic device to perform biometric identification.

The sensing module 12 faces the inner surface S1 of the cover plate 10 and is disposed adjacent to the inner surface S1 of the cover plate 10. The sensing module 12 is configured to capture images of biometric features for biometric identification. In the exemplary embodiment, the sensing module 12 can be any known optical biometric identification module. FIG. 12 schematically illustrates an exemplary embodiment of the sensing module 12, wherein the sensing module 12 includes a carrier 121, a sensor 122, a band pass filter 123, a light collimator 124, and at least one supporting member 125, but the implementation of the sensing module 12 is not limited thereto. For example, in some exemplary embodiments, at least one of the elements described above in the sensing module 12 may be omitted.

The carrier 121 is configured to carry components such as the sensor 122, the band pass filter 123, the light collimator 124, and the supporting member 125 described above. In addition, the carrier 121 may further have circuitry to electrically connect the electronic components disposed thereon with external lines. For example, the carrier 121 may include a flexible printed circuit (FPC) or a printed circuit board (PCB). When the carrier 121 includes an FPC, the carrier 121 may further include a stiffener. That is, the carrier 121 may be a single layer plate or a composite plate.

The sensor 122 is disposed on the carrier 121. A sensing surface S122 of the sensor 122 faces the cover plate 10 to receive the light beam (light beam with biometric information) reflected by the object. For example, the sensor 122 may include a charge coupled device (CCD), a complementary metal-oxide semiconductor (CMOS) or other suitable kinds of image sensing components. In the exemplary embodiment, the sensing module 12 further includes a wire 126 and an encapsulation layer 127. The sensor 122 is electrically connected to the circuit on the carrier 121 through the wire 126. The encapsulation layer 127 is disposed on the carrier 121 and covers the wire 126 to protect the wire 126.

The band pass filter 123 is disposed on the sensor 122 to filter stray light and reduce the interference of stray light on biometric identification. For example, the band pass filter 123 can be an infrared filter that filters infrared light and allows other light to pass through. However, the band filtered by the band pass filter 123 can be changed as needed, and is not limited thereto.

The light collimator 124 is disposed on the band pass filter 123 to collimate the light beam transmitted toward the sensor 122. The light collimator 124 may be any known collimating component, such as fibers, micro structures, micro lenses, or gratings, but is not limited thereto. In the exemplary embodiment, the light collimator 124 may be the light collimator 130 in FIG. 1A, FIG. 6, FIG. 7, FIG. 8, FIG. 9, FIG. 10, or FIG. 11 or any one of the light collimators 130A, 130B, 130C, and 130D shown in FIG. 2 to FIG. 5.

The supporting member 125 is disposed on the carrier 121 and located at the periphery of the sensor 122. When the object presses the outer surface S2 of the cover plate 10, the cover plate 10 is pressed down. On this occasion, the supporting member 125 can support the cover plate 10 that is pressed down to prevent other components in the sensing module 12 from being damaged. The shape of the supporting member 125 may be columnar or annular. When the shape of the supporting member 125 is a columnar shape, a plurality of supporting members 114 may be spaced apart and arranged at the periphery of the sensor 122. When the shape of the supporting member 125 is annular, the annular supporting member 125 can surround the sensor 122.

The frame body 13 and the sensing module 12 are located on the same side of the cover plate 10, and the frame body 13 is disposed around the periphery of the sensing module 12 to provide proper protection for the sensing module 12. In addition, the frame body 13 may be an opaque frame body to shield components that are not intended to be seen by the user.

The frame body 13 is joined to the cover plate 10 through the first adhesive layer 14. The first adhesive layer 14 may be an optical adhesive of the same color as the frame body 13, such as a dark-colored optical adhesive or a black optical adhesive, but is not limited thereto.

The sensing module 12 is joined to the frame body 13 through the second adhesive layer 15. In other words, the sensing module 12 is indirectly joined to the cover plate 10 through the second adhesive layer 15, the frame body 13, and the first adhesive layer 14.

The orthographic projection P15 of the second adhesive layer 15 on the cover plate 10 falls within the orthographic projection P13 of the frame body 13 on the cover plate 10. That is, the second adhesive layer 15 is covered by the frame body 13 when viewed from the side of the cover plate 10. FIG. 12 schematically illustrates one of the cases where the orthographic projection P15 falls within the orthographic projection P13. In FIG. 12, the edge of the orthographic projection P15 does not exceed the edge of the orthographic projection P13, and the edge of the orthographic projection P15 is aligned with the edge of the orthographic projection P13. However, in another exemplary embodiment, the edge of the orthographic projection P15 may not be aligned with the edge of the orthographic projection P13. For example, the edge of the orthographic projection P15 may be retracted by a distance from the edge of the orthographic projection P13, but not limited thereto.

In the case where the sensing module is directly adhered to the cover plate through an adhesive layer, the reflectance and/or transmittance in the region where the adhesive layer is provided (for example, above the supporting member)

are/is different from that in the region where the adhesive layer is not provided (for example, above the collimator) due to the difference in refractive indices, causing the user to easily perceive the appearance of the sensing module when operating the biometric identification device.

In contrast, the sensing module 12 is adhered to the frame body 13 through the second adhesive layer 15, and the second adhesive layer 15 is hidden under the frame body 13, thereby preventing the second adhesive layer 15 from affecting the visual effect. In addition, since the sensing module 12 is indirectly joined to the cover plate 10 through the second adhesive layer 15, the frame body 13 and the first adhesive layer 14, there may be no need to dispose an adhesive layer between the cover plate 10 and the sensing module 12. That is, an air gap AG may be present between the cover plate 10 and the sensing module 12. Since there may be only one light transmission medium (for example, air, that is, an air gap is present between the light collimator 124 and the cover plate 10 as well as between the supporting member 125 and the cover plate 10 without filling an adhesive layer) between the cover plate 10 and the sensing module 12 not covered by the frame body 13 instead of a combination of multiple light transmission media (for example, a combination of air and adhesive layer), the sensing module 12 is not easily perceived by the user.

According to different needs, the image capturing device 1 may further include other components or film layers. For example, the image capturing device 1 may further include an anti-reflection layer (not shown). The anti-reflection layer may be disposed on the inner surface S1 of the cover plate 10 to reduce interface reflection occurred on the inner surface S1.

Figure 13:
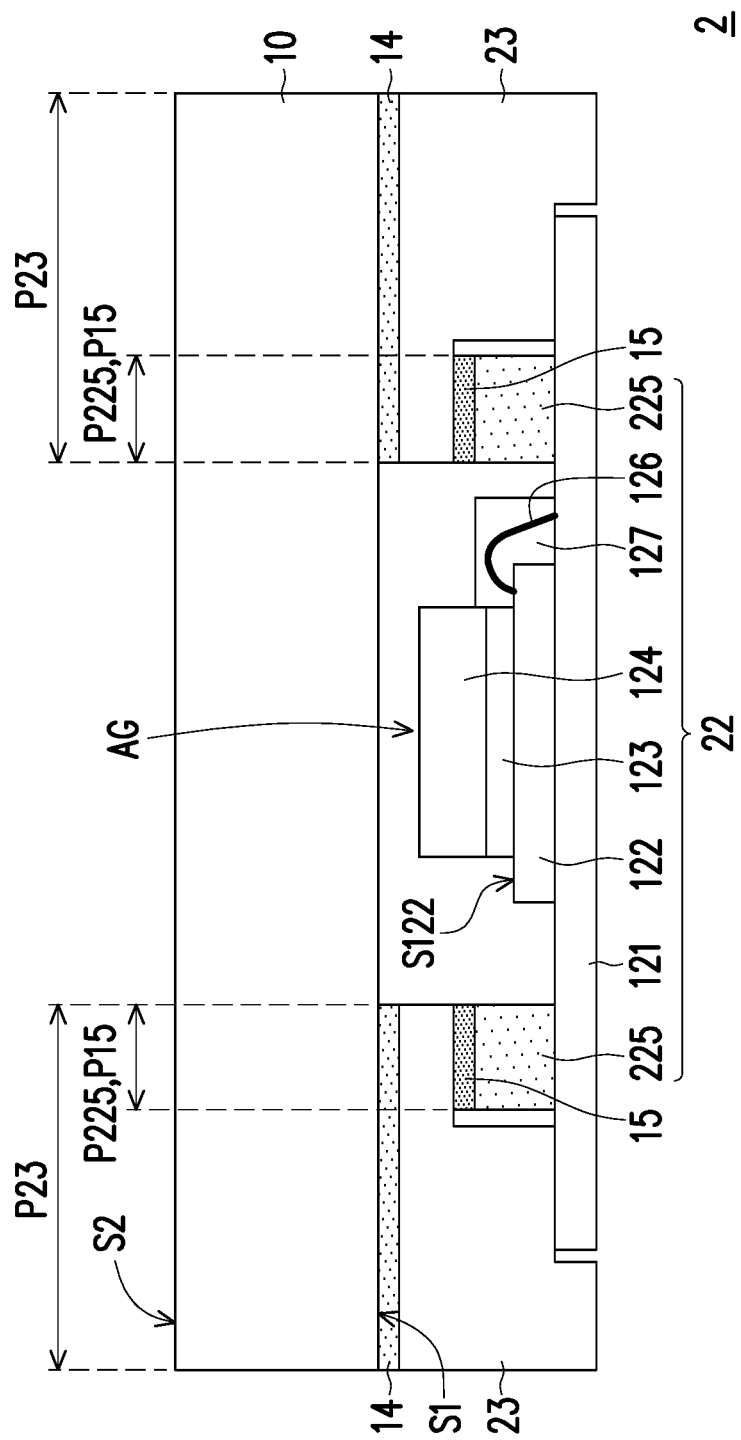

Referring to FIG. 13, the main differences between the image capturing device 2 of the second exemplary embodiment and the image capturing device 1 of FIG. 12 are as follows. In the image capturing device 1, the supporting member 125 and the second adhesive layer 15 are not overlapped, and only the second adhesive layer 15 among the supporting member 125 and the second adhesive layer 15 is hidden under the frame body 13. Specifically, the second adhesive layer 15 is located between the carrier 121 and the frame body 13, and the carrier 121 is joined to the frame body 13 through the second adhesive layer 15. In addition, the supporting member 125 is located between the second adhesive layer 15 and the sensor 122, and an air gap AG is present between the supporting member 125 and the cover plate 10.

On the other hand, in the image capturing device 2, the supporting member 225 is overlapped with the second adhesive layer 15, and the supporting member 225 and the second adhesive layer 15 are both hidden under the frame body 23. Specifically, the supporting member 225 is also located between the carrier 121 and the frame body 23, and the supporting member 225 is joined to the frame body 23 through the second adhesive layer 15. Specifically, the supporting member 225 is located between the carrier 121 and the second adhesive layer 15, and the second adhesive layer 15 is located between the supporting member 225 and the frame body 23. Furthermore, at least a portion of the orthographic projection P235 of the supporting member 225 on the cover plate 10 falls within the orthographic projection P23 of the frame body 23 on the cover plate 10.

By overlapping the supporting member 225 and the second adhesive layer 15, the layout area of the two can be effectively reduced, so that the wiring layout space is more sufficient, and the area of the carrier 121 can be reduced. Accordingly, the overall area of the sensing module 22 can be further reduced.

Figure 14:
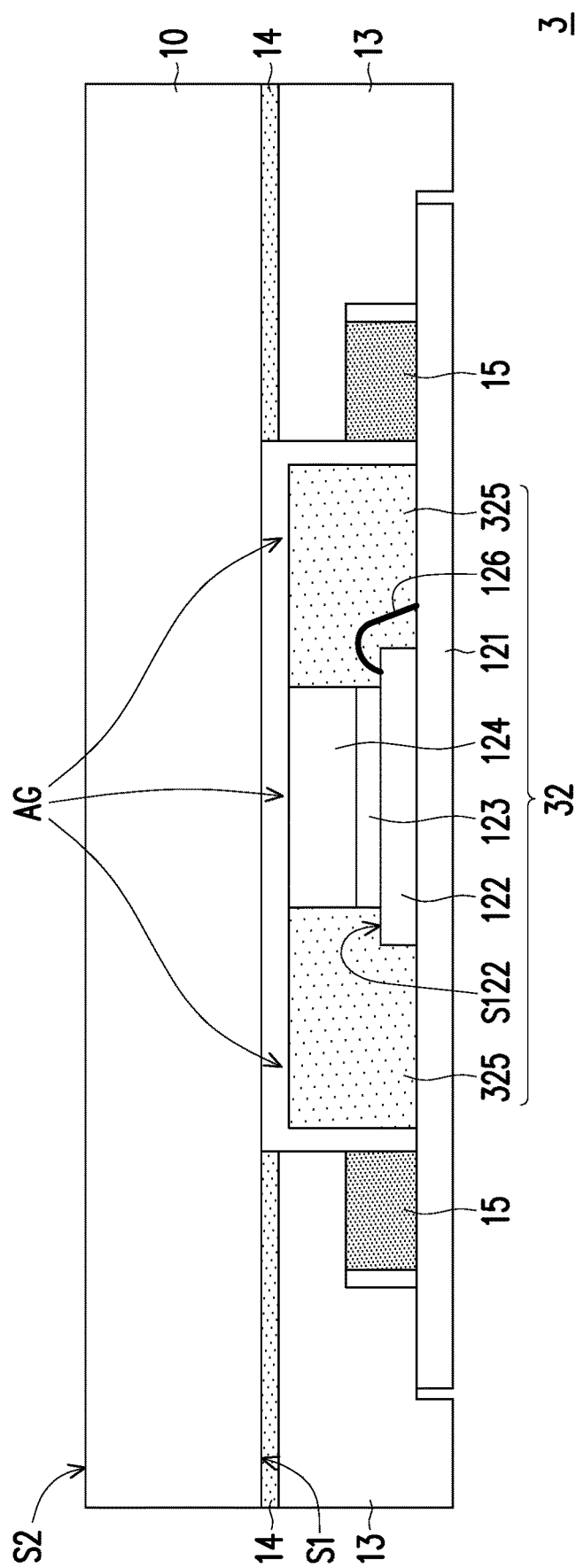

Referring to FIG. 14, the main differences between the image capturing device 3 of the third exemplary embodiment and the image capturing device 1 of FIG. 12 are as follows. In the image capturing device 1, a distance is kept between the supporting member 125 and the sensor 122 (the two are not in contact), and the sensing module 12 further includes an encapsulation layer 127 to protect the wire 126.

On the other hand, in the image capturing device 3, the supporting member 325 is in contact with the carrier 121, the sensor 122, the band pass filter 123 and the light collimator 124, and the supporting member 325 fixes the sensor 122, the band pass filter 123 and the light collimator 124 on the carrier 121. For example, the supporting member 325 can be formed by curing the encapsulant. Therefore, the sensing module 32 can omit the encapsulation layer 127 of FIG. 1. The supporting member 325 can be an opaque supporting member, but not limited thereto.

Figure 15:
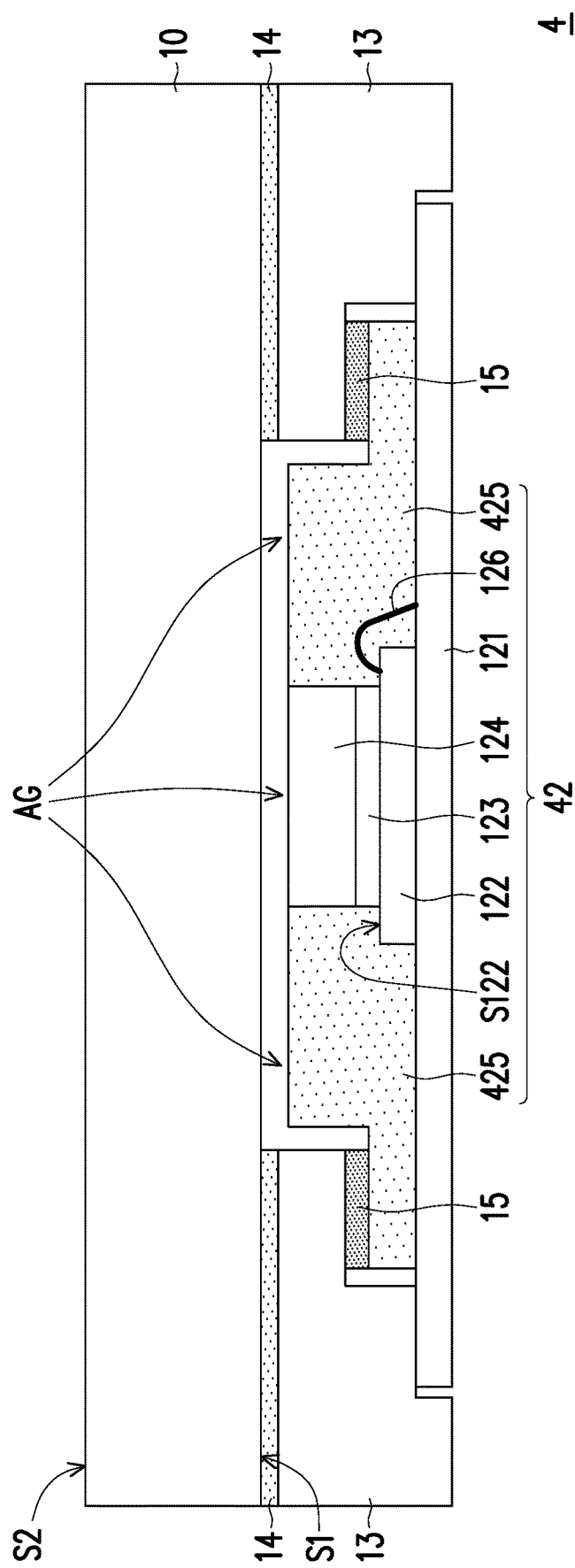

Referring to FIG. 15, the main differences between the image capturing device 4 of the fourth exemplary embodiment and the image capturing device 3 of FIG. 14 are as follows. In the sensing module 32 of the image capturing device 3, the supporting member 325 does not overlap the frame body 13, and the carrier 121 is joined to the frame body 13 through the second adhesive layer 15.

On the other hand, in the sensing module 42 of the image capturing device 4, the supporting member 425 further extends below the frame body 13 and is overlapped with the frame body 13. In addition, the supporting member 425 is joined to the frame body 13 through the second adhesive layer 15. The supporting member 425 can be an opaque supporting member, but not limited thereto.

Figure 16:
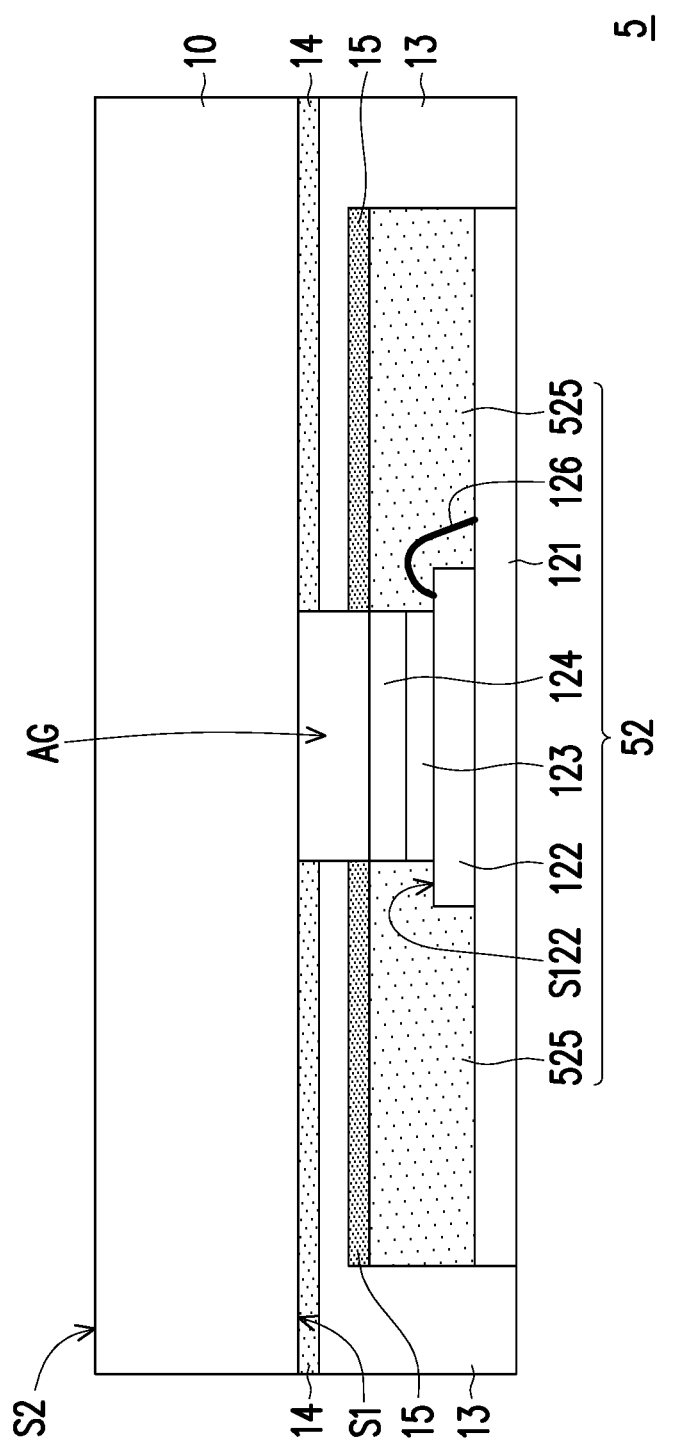

Referring to FIG. 16, the main differences between the image capturing device 5 of the fifth exemplary embodiment and the image capturing device 4 of FIG. 15 are as follows. In the sensing module 52 of the image capturing device 5, the surface, which is connected to the second adhesive layer 15, of the supporting member 525 is flush with the top surface (the surface that faces the cover plate 10) of the light collimator 124. The supporting member 525 can be an opaque supporting member, but not limited thereto. In another exemplary embodiment, the carrier 121 may be joined to the frame body 13 through an adhesive layer or fixing mechanism. Moreover, the supporting member 525 may be joined to the carrier 121 through another adhesive layer or fixing mechanism.

Figure 17:
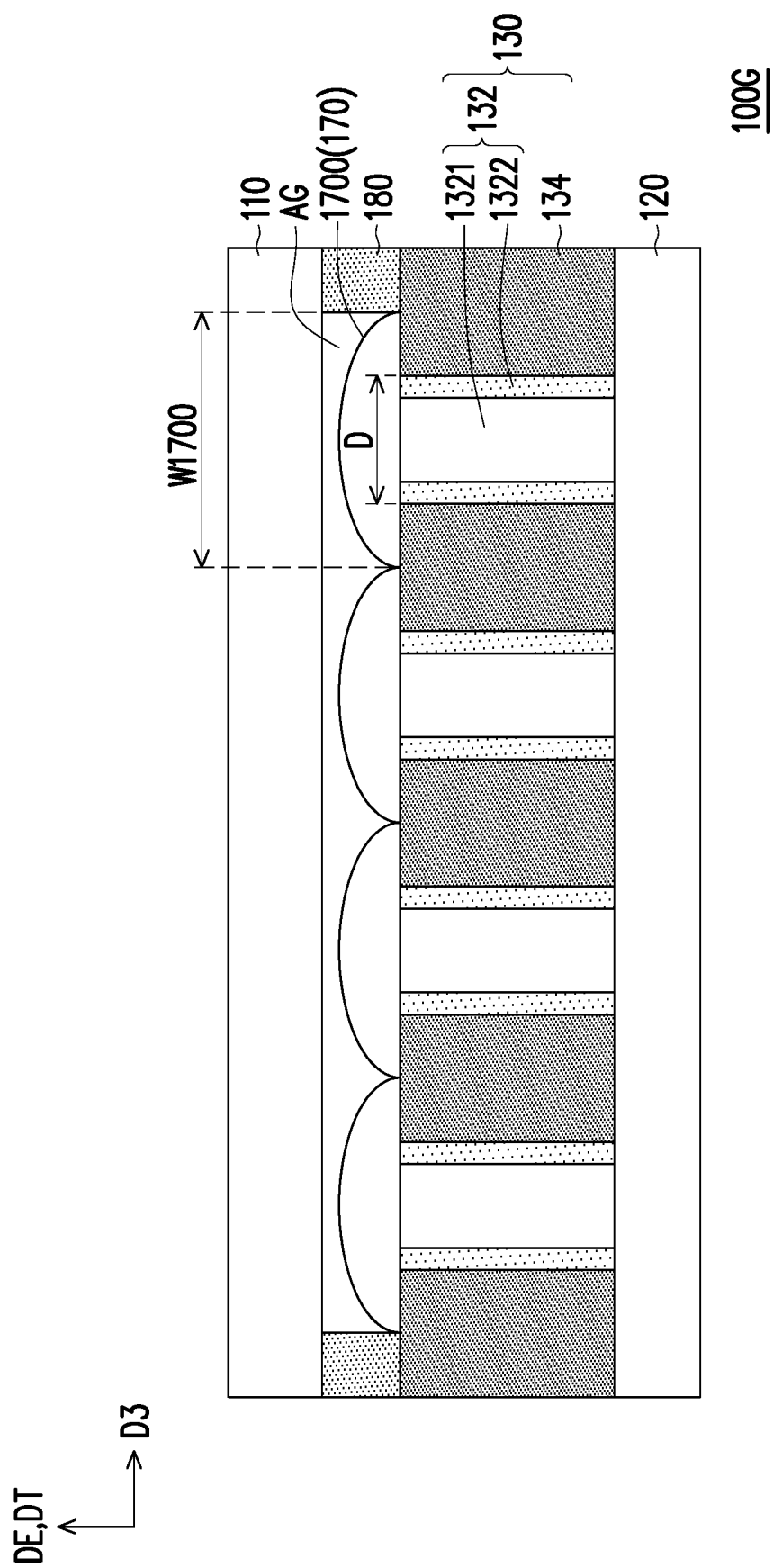
FIG. 17 is a schematic cross-sectional view of an image capturing module according to an exemplary embodiment of the invention.

FIG. 17 is a schematic cross-sectional view of an image capturing module 100G according to an exemplary embodiment of the invention. Referring to FIG. 17, the main differences between the image capturing module 100G of the exemplary embodiment and the image capturing module 100 of FIG. 1A are as follows. The image capturing module 100G further includes a micro lens array 170 and an adhesive layer 180.

The micro lens array 170 is disposed between the light collimator 130 and the cover plate 110. The micro lens array 170 is adapted to converge light into the core 1321 of the fiber 13. Specifically, the micro lens array 170 includes a plurality of micro lenses 1700, and the at least one fiber 132 is covered by at least one of the plurality of micro lenses 1700. In the exemplary embodiment, a width W1700 of one micro lens 1700 is larger than a width of one fiber 132 along a direction D3, and the width of one fiber 132 along the direction D3 is equal to the distance D between two light absorbing columns 134 farthest from each other among the light absorbing columns 134 in each of the light collimating units U (see FIG. 2). Moreover, one fiber 132 is covered by one micro lens 1700. Furthermore, a sectional shape of one micro lens 1700 (or the sectional shape of each of the micro lenses 1700) is a semicircle. Herein, the semicircle is not limited to half of a circle.

It is noted that, the disposition relationship between the plurality of micro lenses 1700 and the fibers 132, and the sectional shape of each of the micro lenses 1700 are not limited to the above. In one exemplary embodiment, the plurality of micro lenses 1700 may be separated from each other. In one exemplary embodiment, one micro lens 1700 may cover a plurality of adjacent fibers 132. In one exemplary embodiment, a sectional shape of at least one of the plurality of micro lenses 1700 may be a triangle or a trapezoid. The triangle can be an isosceles triangle or a non-isosceles triangle.

The adhesive layer 180 surrounds the micro lens array 170, wherein the cover plate 110 is adhered to the light collimator 130 through the adhesive layer 180, and an air gap AG is present between the cover plate 110 and the micro lens array 170. The adhesive layer 180 may be optical clear adhesive (OCA), but not limited thereto.

In the exemplary embodiment, the cover plate 110 may include a transparent cover plate, an organic light emitting display panel, a touch panel or a combination of at least two of the above. In one exemplary embodiment, the light collimator 130 may be replaced by one of the light collimator 130A in FIG. 2 to the light collimator 130D in FIG. 5. In one exemplary embodiment, at least one of the image capturing module 100A in FIG. 6 to the image capturing module 100F in FIG. 11 may further include the micro lens array 170 and the adhesive layer 180 described above. In one exemplary embodiment, at least one of the sensing module 12 in FIG. 12 to the sensing module 52 in FIG. 16 may further include the micro lens array 170, wherein the micro lens array 170 may be disposed on the light collimator 124 and located between the cover plate 10 and the light collimator 124, and the air gap AG is present between the cover plate 10 and the micro lens array 170.

In view of the foregoing, in the image capturing module provided by the exemplary embodiments of the invention, since the light leaking from the clad is absorbed by the light absorbing columns surrounding the fiber, the crosstalk problem is effectively improved. Therefore, the image capturing module features a favorable identifying capability. In an exemplary embodiment, the devices (e.g., the fiber or the light absorbing columns) in the light collimator may further include light absorption particles to absorb the stray light. In addition, the image capturing module may further include other devices (e.g., the light source, the display panel, the band pass filter, or the fixing devices and the like) according to needs. In an exemplary embodiment, a micro lens array may be disposed on the light collimator, and an air gap is present between the cover plate and the micro lens array.

Moreover, in the image capturing device of the exemplary embodiments of the disclosure, the frame body is adhered to the cover plate through the first adhesive layer, the sensing module is adhered to the frame body through the second adhesive layer, and the orthographic projection of the second adhesive layer on the cover plate falls within the orthographic projection of the frame body on the cover plate. Therefore, when viewed from the side of the cover plate, the second adhesive layer is covered by the frame body. By hiding the second adhesive layer under the frame body, it is possible to prevent the second adhesive layer from affecting the visual effect. In addition, since the sensing module is indirectly joined to the cover plate through the second adhesive layer, the frame body and the first adhesive layer, there is no need to provide an adhesive layer between the cover plate and the sensing module not covered by the frame body. With such design, there may be only one light transmission medium (such as air) between the cover plate and the sensing module not covered by the frame body, so the sensing module is not easily perceived by the user. In an exemplary embodiment, the supporting member of the sensing module can be overlapped with the second adhesive layer, such that the wiring layout space on the carrier can be more sufficient or the overall area of the sensing module can be further reduced. In another exemplary embodiment, the supporting member may be formed by curing the encapsulant. In still another exemplary embodiment, the supporting member formed by curing the encapsulant may be overlapped with the second adhesive layer.

It will be apparent to those skilled in the art that various modifications and variations can be made to the disclosed exemplary embodiments without departing from the scope or spirit of the disclosure. In view of the foregoing, it is intended that the disclosure covers modifications and variations provided that they fall within the scope of the following claims and their equivalents.

What is claimed is:

1. An image capturing device comprising:
    a cover plate;
    a sensing module;
    a frame body, wherein the frame body and the sensing module are located on the same side of the cover plate;
    a first adhesive layer, wherein the frame body is joined to the cover plate through the first adhesive layer; and
    a second adhesive layer, wherein the sensing module is joined to the frame body through the second adhesive layer, and an orthographic projection of the second adhesive layer on the cover plate falls within an orthographic projection of the frame body on the cover plate,
    wherein the sensing module comprises:
    a sensor; and
    a light collimator disposed between the cover plate and the sensor, the light collimator comprising a plurality of light collimating units, each of the light collimating units comprising at least one fiber and a plurality of light absorbing columns, wherein the light absorbing columns are disposed parallel to the at least one fiber and surrounding the at least one fiber, a thickness of the light collimator is T, a distance between two light absorbing columns farthest from each other among the light absorbing columns in each of the light collimating units is D, a numerical aperture of the at least one fiber is NA, NA≤0.7, and D≤T×tan[sin$^{-1}$(NA)].

2. The image capturing device of claim 1, wherein the cover plate comprises a transparent cover plate, an organic light emitting display panel, a touch panel or a combination of at least two of the above.

3. The image capturing device of claim 1, wherein an air gap is present between the cover plate and the sensing module.

4. The image capturing device of claim 1, wherein the sensing module further comprises:
    a carrier, wherein the sensor is disposed on the carrier;
    a band pass filter disposed on the sensor, wherein the light collimator is disposed on the band pass filter, and an air gap is present between the light collimator and the cover plate; and
    at least one supporting member disposed on the carrier and located at a periphery of the sensor.

5. The image capturing device of claim 4, wherein the band pass filter is an infrared filter.

6. The image capturing device of claim 4, wherein the second adhesive layer is located between the carrier and the frame body.

7. The image capturing device of claim 6, wherein the carrier is joined to the frame body through the second adhesive layer, the at least one supporting member is located between the second adhesive layer and the sensor, and an air gap is present between the at least one supporting member and the cover plate.

8. The image capturing device of claim 7, wherein a distance is kept between the at least one supporting member and the sensor.

9. The image capturing device of claim 7, wherein the at least one supporting member is in contact with the carrier, the sensor, the band pass filter and the light collimator, and the at least one supporting member fixes the sensor, the band pass filter and the light collimator on the carrier.

10. The image capturing device of claim 6, wherein the at least one supporting member is located between the carrier and the frame body, the at least one supporting member is joined to the frame body through the second adhesive layer, and at least a portion of an orthographic projection of the at least one supporting member on the cover plate falls within the orthographic projection of the frame body on the cover plate.

11. The image capturing device of claim 1, wherein any two adjacent light collimating units share at least one light absorbing column.

12. The image capturing device of claim 1, wherein any two adjacent light collimating units do not share any light absorbing column.

13. The image capturing device of claim 1, wherein a clad of the at least one fiber comprises a plurality of light absorption particles.

14. The image capturing device of claim 1, wherein each of the light absorbing columns is a solid light absorbing column body.

15. The image capturing device of claim 1, wherein each of the light absorbing columns comprises a light absorbing core and a clad encapsulating the light absorbing core, and the clad comprises a plurality of light absorption particles.

16. The image capturing device of claim 1, wherein extending directions of the at least one fiber and the light absorbing columns are perpendicular to or inclined with respect to the cover plate.

17. The image capturing device of claim 1, wherein each of the light collimating units comprises a plurality of the fibers surrounded by the light absorbing columns, and the distance between two light absorbing columns farthest from each other among the light absorbing columns in each of the light collimating units is larger than a diameter of each of the fibers.

18. The image capturing device of claim 1, wherein the light absorbing columns are not located between any two fibers located in the same light collimating unit.

19. The image capturing device of claim 1, wherein the sensing module further comprises:
a micro lens array disposed between the light collimator and the cover plate.

20. An image capturing module comprising:
a cover plate;
a sensor;
a light collimator disposed between the cover plate and the sensor, the light collimator comprising a plurality of light collimating units, each of the light collimating units comprising at least one fiber and a plurality of light absorbing columns, wherein the light absorbing columns are disposed parallel to the at least one fiber and surrounding the at least one fiber, a thickness of the light collimator is T, a distance between two light absorbing columns farthest from each other among the light absorbing columns in each of the light collimating units is D, a numerical aperture of the at least one fiber is NA, NA≤0.7, and D≤T×tan[sin$^{-1}$(NA)];
a micro lens array disposed between the light collimator and the cover plate; and
an adhesive layer, surrounding the micro lens array, wherein the cover plate is adhered to the light collimator through the adhesive layer, and an air gap is present between the cover plate and the micro lens array.

21. The image capturing module of claim 20, wherein the cover plate comprises a transparent cover plate, an organic light emitting display panel, a touch panel or a combination of at least two of the above.

22. The image capturing module of claim 20, wherein the micro lens array comprises a plurality of micro lenses, and the at least one fiber is covered by at least one of the plurality of micro lenses.

23. The image capturing module of claim 22, wherein a sectional shape of at least one of the plurality of micro lenses is a semicircle, a triangle or a trapezoid.

* * * * *